US009253361B2

(12) United States Patent
Enomoto

(10) Patent No.: US 9,253,361 B2
(45) Date of Patent: Feb. 2, 2016

(54) IMAGE FORMING APPARATUS AND IMAGE PROCESSING SYSTEM CAPABLE OF SAVING LOG OF TEXT DATA PORTION INCLUDED IN IMAGE DATA

(71) Applicant: KYOCERA Document Solutions Inc., Osaka (JP)

(72) Inventor: Kyozo Enomoto, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 14/546,379

(22) Filed: Nov. 18, 2014

(65) Prior Publication Data
US 2015/0146259 A1 May 28, 2015

(30) Foreign Application Priority Data

Nov. 22, 2013 (JP) .................................. 2013-241693

(51) Int. Cl.
*H04N 1/32* (2006.01)
*H04N 1/00* (2006.01)
*H04N 1/21* (2006.01)

(52) U.S. Cl.
CPC ....... *H04N 1/32112* (2013.01); *H04N 1/00244* (2013.01); *H04N 1/2183* (2013.01); *H04N 1/32358* (2013.01); *H04N 2201/0094* (2013.01)

(58) Field of Classification Search
None
See application file for complete search history.

(56) References Cited

U.S. PATENT DOCUMENTS

| 7,099,023 | B2 * | 8/2006 | Chrisop et al. | 358/1.14 |
| 7,742,581 | B2 * | 6/2010 | Hodge | H04L 12/5835 379/100.08 |
| 7,843,578 | B2 * | 11/2010 | Nonaka et al. | 358/1.13 |
| 7,978,353 | B2 * | 7/2011 | Kasatani | 358/1.14 |
| 8,144,136 | B2 * | 3/2012 | Minakuchi | 345/204 |
| 8,259,124 | B2 * | 9/2012 | Averett et al. | 345/581 |
| 8,593,661 | B2 * | 11/2013 | Shimizu | H04N 1/00244 358/1.15 |
| 8,931,044 | B1 * | 1/2015 | Subramanian | G06F 21/6245 382/100 |
| 9,069,982 | B2 * | 6/2015 | Coles | G06F 21/6209 |
| 2013/0169985 | A1 * | 7/2013 | Inomata et al. | 358/1.13 |

FOREIGN PATENT DOCUMENTS

JP 2008-225928 A 9/2008

* cited by examiner

*Primary Examiner* — Paul F Payer
(74) *Attorney, Agent, or Firm* — Studebaker & Brackett PC

(57) ABSTRACT

An image forming apparatus includes a saving type storing section, an image data saving section, and a text data saving section. The saving type storing section is configured to store a saving type for image data of a read original document. The image data saving section is configured to save the image data. The text data saving section is configured to save a text data portion included in the image data. When a saving type indicative of processing to save the text data portion is set as the saving type, the text data portion is converted in the text format and saved to the text data saving section. When a saving type indicative of processing to save the entire image data is set as the saving type, the entire image data is saved to the image data saving section.

7 Claims, 3 Drawing Sheets

IMAGE FORMING APPARATUS AND IMAGE PROCESSING SYSTEM CAPABLE OF SAVING LOG OF TEXT DATA PORTION INCLUDED IN IMAGE DATA

INCORPORATION BY REFERENCE

The present application claims priority under 35 U.S.C. §119 to Japanese Patent Application No. 2013-241693, filed Nov. 22, 2013. The contents of this application are incorporated herein by reference in their entirety.

BACKGROUND

The present disclosure relates to image forming apparatuses and image processing systems.

Image forming apparatuses may function as a printer, a multifunction printer, a multifunction peripheral device, or a multifunction peripheral. Such an image forming apparatus has a function of, for example, reading an original document using a scanner and converting the read one to image data. In this manner, the image forming apparatus can readily convert read original documents to image data. The image forming apparatus can accordingly print on paper image data of original documents describing confidential information, store it in an external memory, and transmit it to another device. The image forming apparatus stores image data of all of the read original documents as an image log into itself or a management server connected to the image forming apparatus through a network. The image forming apparatus confirms whether or not the stored image data contains confidential information. Further, the image forming apparatus notifies a user of the fact that the image data of the read original documents is monitored. In this manner, the image data of an original document describing the confidential information is prevented from leakage to a third person. However, the image forming apparatus and the management server store image data of all read original documents, which requires a mass storage device such as a large-capacity hard disc drive.

In order to address this problem, various measures are taken for conservation of a memory capacity for storing image data. For example, an image processing device, an image processing system, and an image processing program of some type are capable of selecting any of the following processing when a blank document is detected: processing to include minimized image data of the blank document in log image data, processing to generate log image data excluding the blank document, processing to add character data of "blank" or the like to minimized image data of the blank document, and processing to generate image data including the blank document. In this manner, the image processing system can conserve the memory capacity for storing image data.

SUMMARY

An image forming apparatus according to the present disclosure includes a saving type storing section, an image data saving section, and a text data saving section. The saving type storage section is configured to store a saving type for image data of a read original document. The image data saving section is configured to save the image data. The text data saving section is configured to save a text data portion included in the image data. When a saving type indicative of processing to save the text data portion is set as the saving type in the image forming apparatus, the text data portion is converted in a text format and saved in the text data saving section. When a saving type indicative of processing to save the entire image data is set as the saving type in the image forming apparatus, the entire image data is saved in the image data saving section.

An image processing system according to the present disclosure includes an image forming apparatus and an external server. The image forming apparatus and the external server are connected together through a network. The image forming apparatus includes an image data generating section and a saving type storage section. The image data generating section is configured to read an original document to generate image data. The saving type storage section is configured to store a saving type for the image data. The external server includes an image data saving section and a text data saving section. The image data saving section is configured to save the image data. The text data saving section is configured to save a text data portion included in the image data. When a saving type indicative of processing to save the text data portion is set as the saving type in the image processing system, the text data portion is converted in a text format and saved in the text data saving section. When a saving type indicative of processing to save the entire image data is set as the saving type in the image processing system, the entire image data is saved in the image data saving section.

DETAILED DESCRIPTION

Embodiments of the present disclosure will be described below with reference to the accompanying drawings. In an image forming apparatus according to the present embodiment, an administrator selects and sets one of saving types for image data of a read original document. The saving types include a type indicative of processing to save only a text data portion of image data and a type indicative of processing to save the entire image data. The image forming apparatus saves the text data portion or the entire image data to a memory of its own according to the set saving type. Further, the image forming apparatus saves the text data portion in text format.

Figure 1:
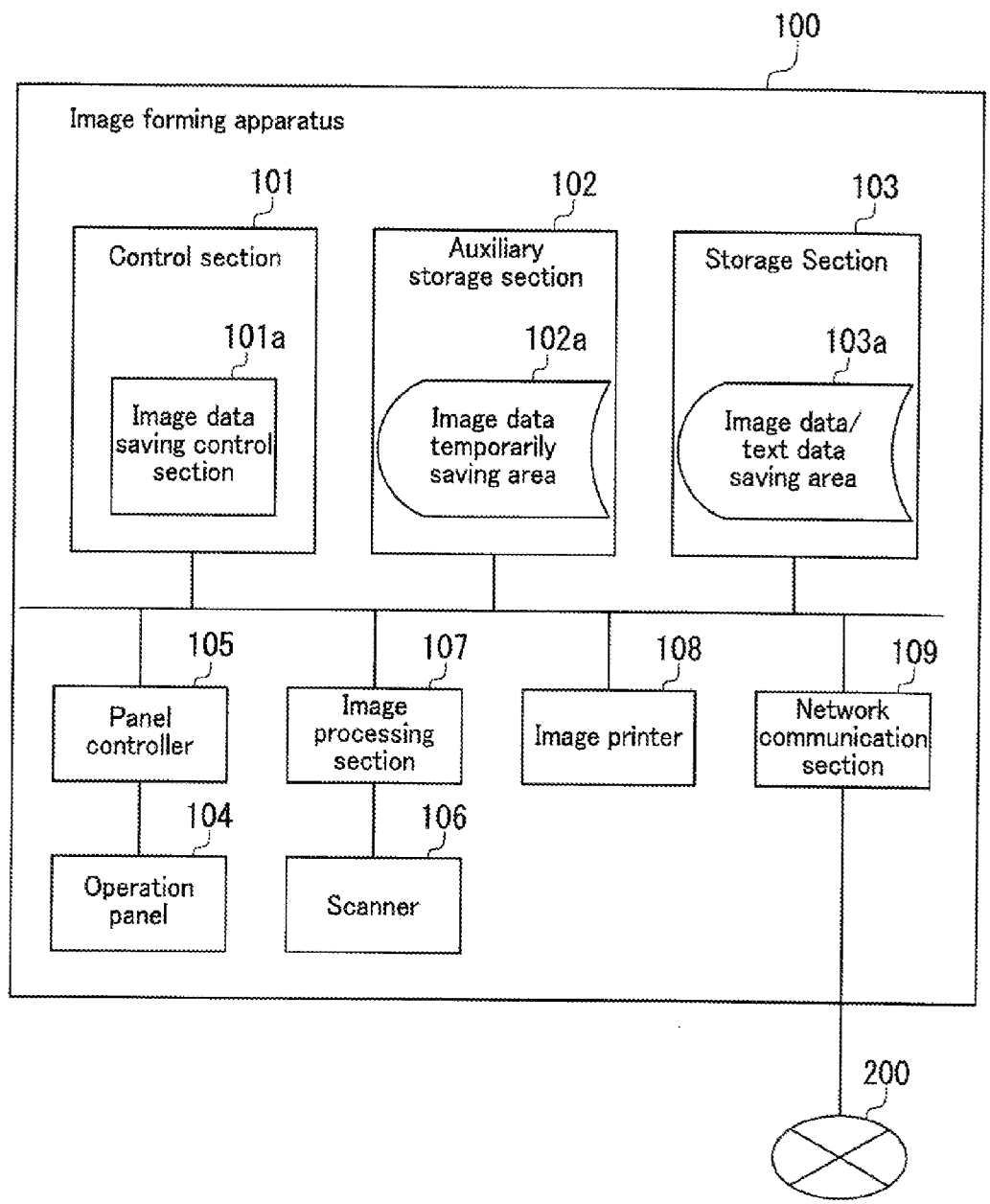
FIG. 1 is a block diagram showing a configuration of an image forming apparatuses according to an embodiment of the present disclosure.

The functional configuration of an image forming apparatus 100 according to the present embodiment will be described with reference to FIG. 1. FIG. 1 is a block diagram showing the configuration of the image forming apparatus 100. The image forming apparatus 100 includes a control section 101, an auxiliary storage section 102, a storage section 103, an operation panel 104, a panel controller 105, a scanner 106, an image processing section 107, an image printer 108, and a network communication section 109. These elements are connected together via a bus or the like. The image processing section 107 generates image data based on an original document read by the scanner 106. The image data includes a text data portion and a picture data portion. The control section 101 includes an image data saving control section 101a. The auxiliary storage section 102 includes an image data temporarily saving area 102a. The storage section 103 includes an image data/text data saving area 103a. The control section 101 includes a main storage such as a RAM or a ROM, and a controller such as a micro processing unit (MPU) or a central processing unit (CPU). The control section 101 comprehensively controls interfaces such as an input/output (I/O), a universal serial bus (USB), etc., a bus controller, etc. in addition to the respective elements of the image forming apparatus 100. The image data saving control section 101a saves the text data portion or the entire image data out of the image data generated by the image processing section 107 to the image data/text data saving area 103a. Hereinafter, the processing to save the text data portion and/or the entire image data to the image data/text data saving area 103a is referred to as image data saving control. The image data saving control section 101a will be described later in detail.

The auxiliary storage section 102 stores programs and data for processing that the control section 101 executes. The auxiliary storage section 102 is a flash memory. The image data temporarily saving area 102a temporarily saves the image data generated by the image processing section 107. Further, the auxiliary storage section 102 functions as a saving type storing section. The saving type storing section stores the saving types to be set for the image data of an read original document.

The storage section 103 stores data and programs. The storage section 103 is a storage device such as a hard disk or the like. The image data/text data saving area 103a functions as an entire image data saving section and a text data saving section. The entire image data saving section saves the entire image data. The text data saving section saves the text data portion. The entire image data saving section and the text data saving section utilize different regions in the storage section 103. Note that the entire image data saving section and the text data saving section may utilize a common region in the storage section 103. Thus, the data storing region can be unified in the storage section 103, thereby facilitating data management.

The operation panel 104 receives an operation and setting by an administrator or a user. The operation panel 104 displays a screen showing operation items indicating functions of the image forming apparatus 100, and a message to notify the administrator or the user. The administrator can set a desired saving type in advance through the operation panel 104.

The panel controller 105 causes the operation panel 104 to display operation items indicating functions of the image forming apparatus 100 as a screen. The panel controller 105 also causes the operation panel 104 to display a message that notifies the administrator or the user of the status of the image forming apparatus 100. The panel controller 105 outputs various settings input through the operation panel 104 by the administrator or the user to the control section 101, the auxiliary storage section 102, or the storage section 103. Upon input of a saving type through the operation panel 104, the panel controller 105 causes the auxiliary storage section 102 to store the saving type.

The scanner 106 scans and digitalizes an original document loaded on a document table of the image forming apparatus 100. The user inputs a scan request through the operation panel 104. The scanner 106 scans the original document on the document table and outputs digitalized data of the original document (hereinafter referred to as digital data) to the image processing section 107.

Upon input of the digital data of the original document from the scanner 106, the image processing section 107 adjusts the image quality, resolution, size, rotational direction, color, etc. of the digital data. The image processing section 107 converts character information in the digital data to bitmap graphics (data in raster format) for imaging (rasterization). In this manner, the image processing section 107 generates image data of an original document. The image processing section 107 saves the generated image data to the image data temporarily saving area 102a of the auxiliary storage section 102. Thereafter, the image processing section 107 outputs a message that notifies the control section 101 of completion of image data generation.

The image printer 108 prints the image data generated by the image processing section 107 on paper according to a print request from the user.

Figure 2:
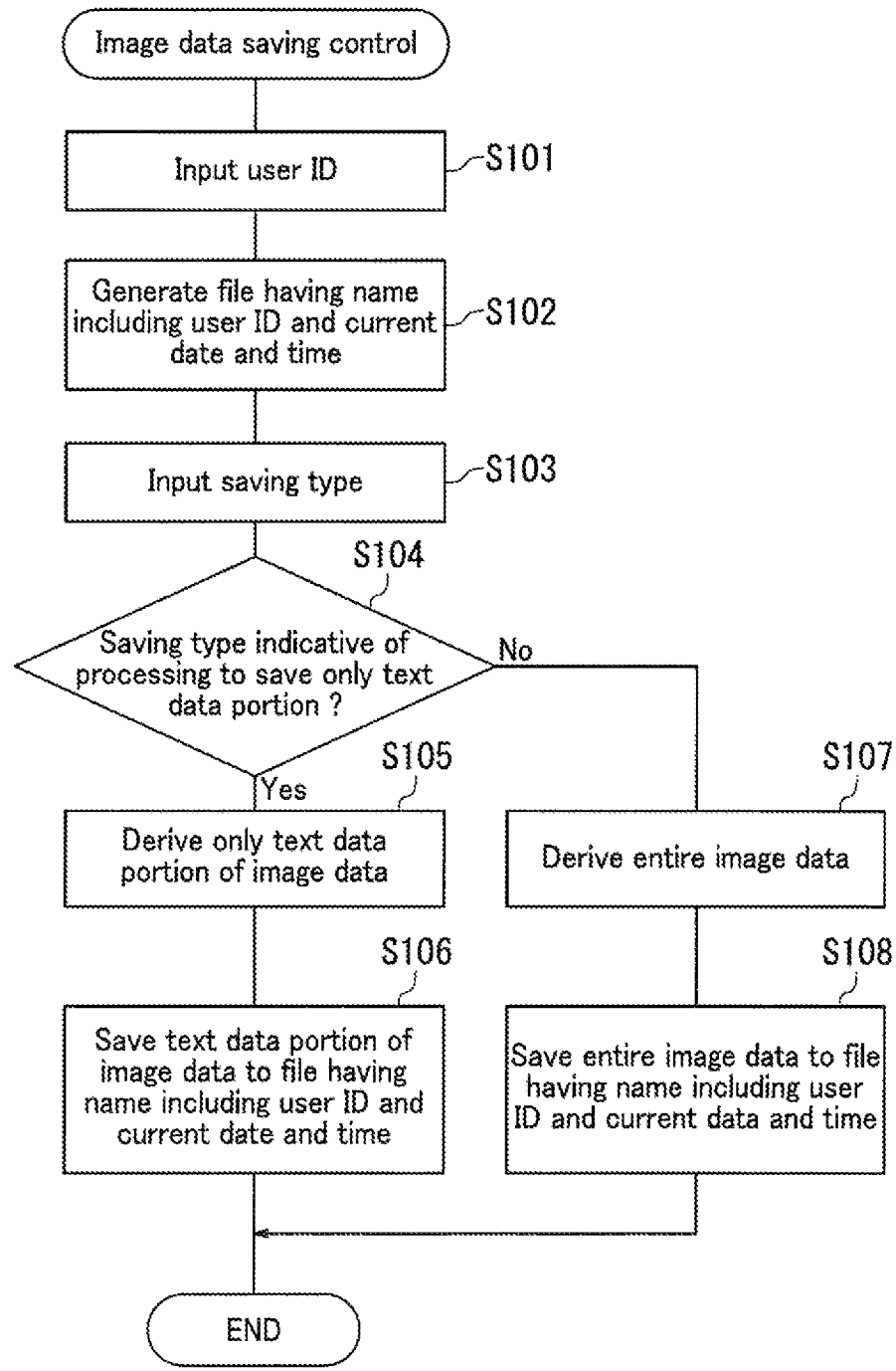
FIG. 2 is a flowchart depicting a flow of image data saving control by the image forming apparatus according to the embodiment of the present disclosure.

The network communication section 109 includes a disconnectable LAN interface for connection to a network 200. The network 200 may be Internet, a local area network (LAN), or a wide area network (WAN), for example. The LAN interface includes a network section. The network section is capable of intelligently sending/receiving data using various network protocols such as TCP/IP, Apple Talk, and SMB. With reference to FIGS. 1 and 2, the image data saving control will be described next that the image data saving control section 101a executes in the image forming apparatus 100 according to an embodiment of the present disclosure. FIG. 2 is a flowchart depicting a flow of the image data saving control that the image forming apparatus 100 executes.

The user loads an original document on the document table, and inputs a user ID through the operation panel 104 and sends a scan request to the scanner 106. The scanner 106 scans the original document loaded on the document table and outputs digital data to the image processing section 107.

The image processing section 107 generates image data from the digital data, saves it to the image data temporarily saving area 102a, and outputs a message that notifies the control section 101 of completion of image data generation. The control section 101 activates the image data saving control section 101a in response to the notification of completion of image data generation input from the image processing section 107. When activated, the image data saving control section 101a starts the image data saving control. Respective steps in the image data saving control shown in FIG. 2 will be discussed sequentially.

{Step S101}

First, the user ID input through the operation panel 104 by the user is input to the image data saving control section 101a through the panel controller 105. The operation panel 104 and the panel controller 105 function as a user ID input section in combination. The user ID input section inputs the user ID to the image data saving control section 101a.

{Step S102}

Next, the image data saving control section 101a generates a file having a name including the user ID input at Step S101 and the current date and time to the image data/text data saving area 103a. Specifically, the image data saving control section 101a functioning as a file generating section generates a file having a name including the user ID and the current date and time, and saves the generated file to the image data/text data saving area 103a.

{Step S103}

Subsequently, a saving type set in advance by the administrator in the auxiliary storage section 102 is input to the image data saving control section 101a.

{Step S104}

Then, the image data saving control section 101a determines whether or not the received saving type is indicative of processing to save only a text data portion of image data. When the saving type is indicative of processing to save only a text data portion of image data (Yes at Step S104), the routine proceeds to Step S105. When the saving type is indicative of processing to save the entire image data rather than only a text data portion (No at Step S104), the routine proceeds to Step S107.

{Step S105}

When the determination at Step S104 is positive, the image data is input from the image data temporarily saving area 102a to the image data saving control section 101a. The image data saving control section 101a derives only the text data portion from the input image data. For example, the image data saving control section 101a utilizes its function of an optical character reader (OCR) to extract character information from the image data. The character information corresponds to a text data portion.

{Step S106}

Next, the image data saving control section 101a converts the format of the text data portion derived at Step S105 to a text format. The image data saving control section 101a writes the text data portion converted in the text format into the file generated at Step S102. The image data saving control section 101a saves the file to the image data/text data saving area 103a. Thus, the image data saving control ends.

{Step S107}

When the determination at Step S104 is negative, the image data saving control section 101a derives the entire image data from the image data temporarily saving area 102a.

{Step S108}

Subsequently, the image data saving control section 101a writes the entire image data derived at Step S107 into the file generated at Step S102. The image data saving control section 101a saves the file to the image data/text data saving area 103a. Thus, the image data saving control ends.

As has been described with reference to FIGS. 1 and 2, when the administrator sets the saving type indicative of processing to save only a text data portion of image data, the image data saving control section 101a derives only the text data portion from the image data temporarily saved in the image data temporarily saving area 102a. The image data saving control section 101a can convert the text data portion to the text format and save it to the image data/text data saving area 103a as a log. When the administrator sets the saving type so as to save the entire image data, the image data saving control section 101a derives the entire image data from the image data temporarily saved in the image data temporarily saving area 102a. The image data saving control section 101a can save the entire image data to the image data/text data saving area 103a as an image log. In this manner, in order to conserve the memory storage capacity, the administrator sets the saving type so as to save only the text data portion to the text format as a log. Alternatively, when conservation of the memory storage capacity is not necessary, the administrator may set the saving type so as to save the entire image data as an image log. In other words, conversion of the text data portion to the text format by the image data saving control section 101a can reduce the size of to-be-stored data to small as compared with that of the entire image data. Accordingly, the memory storage capacity can be conserved. When only the text data portion is saved, the administrator can readily retrieve each character or character string relevant to confidential information in the text data portion by using a text editor or the like, rather than visual check.

Moreover, the file in the image data/text data saving area 103a in which the text data portion or the entire image data is written has a name including the user ID and the current date and time. Accordingly, when the confidential information is detected in the text data portion or the entire image data, the user of the image data can be readily identified according to the user ID included in the name of the corresponding file. Similarly, the date and time when the image data is generated can be readily identified according to the date and time included in the name of the corresponding file.

Note that the administrator sets one of the saving types indicative of processing to save only the text data portion derived from the image data and converted in the text format in the image data/text data saving area 103a as a log and processing to save the entire image to the image data/text data saving area 103a as an image log in the present embodiment, which however, should not be taken to limit the present disclosure. The administrator can set another saving type indicative of processing to save both the text data portion and the entire image data to the image data/text data saving area 103a. When the administrator sets the saving type indicative of processing to save both of them, the text data portion converted in the text format and the entire image data are saved in the image data/text data saving area 103a. Accordingly, the administrator can first retrieve a character or a character string relevant to the confidential information in the text data portion by using a text editor or the like, and then, visually check the entire image data corresponding to the text data portion in which the character or the character string is detected. This can enable the user to readily check detailed information relevant to the confidential information.

Moreover, in the present embodiment, setting one of the saving types by the administrator causes the panel controller 105 to store the selected saving type in the auxiliary storage section 102, which however, should not be taken to limit the present disclosure. In an alternative example, the panel controller 105 may automatically set a saving type according to the size of a vacant area in the image data/text data saving area 103a and store the selected saving type in the auxiliary storage section 102. For example, the administrator selects and sets one of predetermined data sizes through the operation panel 104. The predetermined data sizes include a data size necessary for saving both a log of a text data portion in the text format and an image log of corresponding entire image data and a data size necessary for saving only the image log of the entire image data. When a vacant area sufficient for saving both the log of text data portion in the text format and the image log of the entire image data is reserved in the image data/text data saving area 103a, the panel controller 105 automatically sets the saving type indicative of processing to save both of them. When a vacant area sufficient for saving the image log of the entire image data is reserved in the image data/text data saving area 103a rather than for saving both the log of the text data portion in the text format and the image log of the entire image data, the panel controller 105 automatically sets the saving type indicative of processing to save only the image log of the entire image data. Also, when a vacant area sufficient for saving only the image log of the entire image data is not reserved in the image data/text data saving area 103a, the panel controller 105 automatically sets the saving type indicative of processing to save only the log of the text data portion in the text format to the image data/text data saving area 103a.

Furthermore, the image data saving control section 101a can function as a character registering section and a character retrieval section. Specifically, the character registering section can register a character or a character string relevant to confidential information in advance in the storage section 103. The character retrieval section can automatically determine whether or not a text data portion in the text format includes the character or the character string by referencing the character or the character string registered in the storage section 103. Moreover, the image data saving control section 101a may convert a detected character or character string to decorated one in a style of half-tone dot meshing, bold, italic, inversion, underline, etc., and save the converted one to the image data/text data saving area 103a.

Still further, in the present embodiment, the image data saving control section 101a writes and save either or both of the text data portion and the entire image data to the file having a name including the user ID and the current date and time, which however, should not be taken to limit the present disclosure. For example, the image data saving control section 101a may write the user ID and the current date and time at the head or tail of data saved to the file. The data is either or both the text data portion and the entire image data. The head of the data corresponds to the header of the file, for example. The tail of the data corresponds to the footer of the file, for example. Thus, the administrator can easily check the user and the date and time when the image data is generated with his/her eyes in the state in which the data remains opened. In addition, the user ID and the current date and time can be retrieved.

When scanning an original document, the image forming apparatus 100 is so set to request the user to input only his/her user ID through the operation panel 104. Alternatively, the image forming apparatus 100 may be set to request a password in addition. A third person impersonating a user for whom a user ID is issued may generate image data from an original document containing confidential information. However, the aforementioned setting can prevent generation of such image data by impersonation.

Yet further, in the present embodiment, the text data portion or the entire image data is saved to the image data/text data saving area 103a of the storage section 103 included in the image forming apparatus 100, which however, should not be taken to limit the present disclosure. For example, in the present disclosure, the text data portion or the entire image data may be saved to a storage device such as a hard disc drive included in a management server or a file server (hereinafter referred to as an external server).

Figure 3:
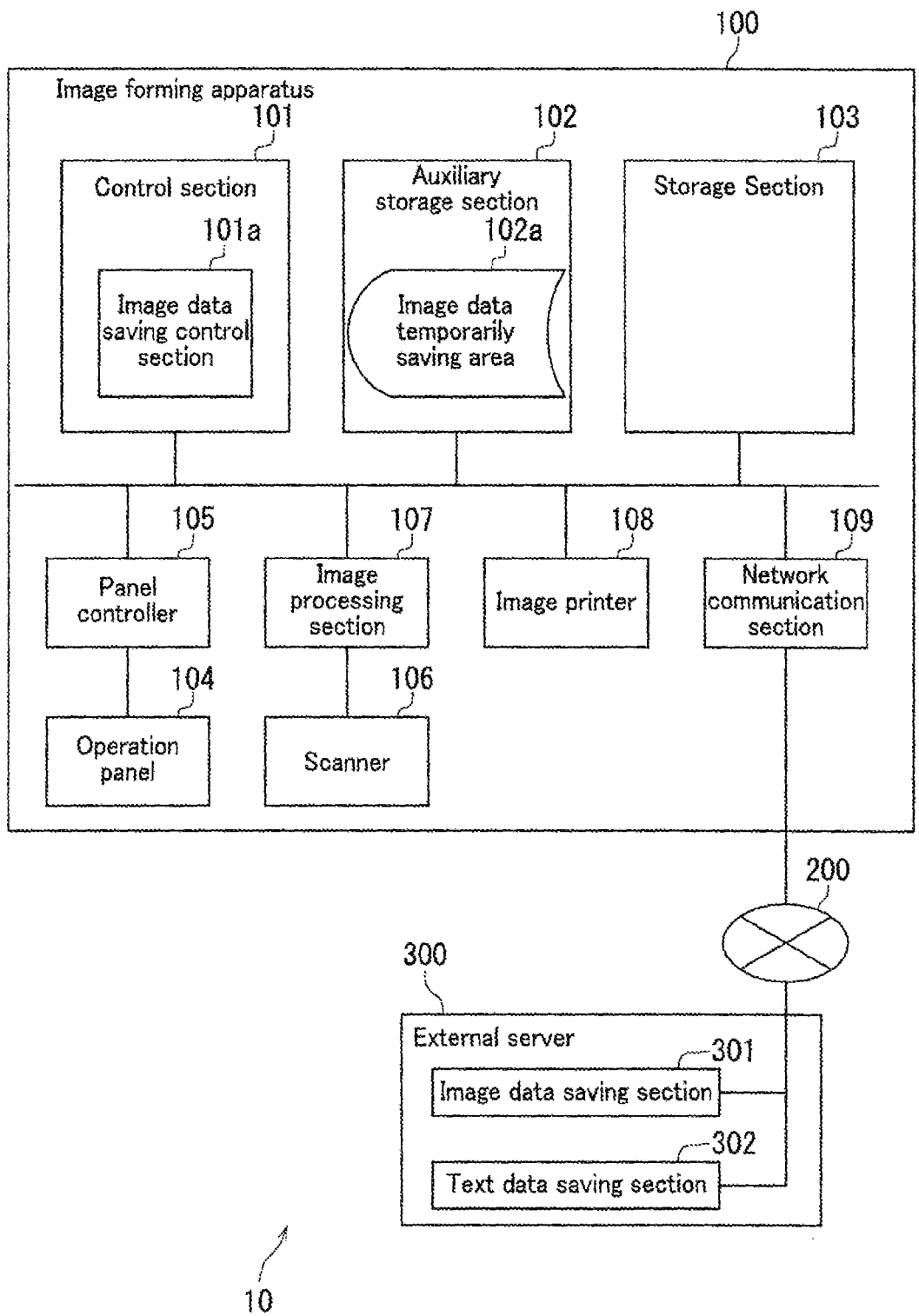
FIG. 3 is a block diagram showing a configuration of an image processing system according to an embodiment of the present disclosure.

FIG. 3 is a block diagram showing a configuration of an image processing system 10. As shown in FIG. 3, the image processing system 10 includes the image forming apparatus 100 and an external server 300. The image forming apparatus 100 is connected to the external server 300 through a network 200. The image processing section 107 of the image forming apparatus 100 functions as an image data generating section. The image data generating section reads an original document to generate image data. The external server 300 includes an image data saving control section 301 and a text data saving section 302. The image data saving control section 301 and the text data saving section 302 use a part of a storage device. The image data saving control section 301 and the text data saving section 302 provide in combination the same function as the image data/text data saving area 103a shown in FIG. 1. That is, the image data saving control section 301 saves the entire image data transmitted from the network communication section 109 as an image log. Similarly, the text data saving section 302 saves the text data portion in the text format as a log.

Thus, the image forming apparatus 100 and the image processing system 10 in the present disclosure can conserve the storage capacity for image data of a read original document and can enable easy determination as to whether or not a character or a character string relevant to confidential information is present in image data.

The present disclosure has been described so far through the specific embodiment. However, the above embodiments are mere examples of the present disclosure and should not be taken to limit the present disclosure.

What is claimed is:

1. An image forming apparatus, comprising:
a saving type storing section configured to store a saving type of an image log for image data of a read original document;
an image data saving section configured to save the image data; and
a text data saving section configured to save a text data portion included in the image data, wherein
character information that corresponds to the text data portion is extracted from the image data by an optical character reader,
when a first saving type indicative of processing to save a log of the text data portion included in the image data is set as the saving type, only the text data portion that is converted in a text format is saved in the text data saving section, a size of the text data portion being smaller than that of the entire image data,
when a second saving type indicative of processing to save an image log of the entire image data is set as the saving type, only the entire image data is saved in the image data saving section,
when a third saving type indicative of processing to save both of the log of the text data portion and the image log of the entire image data is set as the saving type, the text data portion converted in the text format and the entire image data are respectively saved in the text data saving section and the image data saving section,
the saving type is automatically set according to a size of a vacant area in the image data saving section and the text data saving section,
the image forming apparatus further comprises:
a user ID input section configured to input a user ID;
a file generating section configured to generate a file that includes at least one of the text data portion and the entire image data and has a name including the user ID and current date and time;
a character registering section configured to register a character or a character string relevant to confidential information; and
a character retrieval section configured to retrieve the character or the character string from the text data portion by a text editor,
when the text data portion and the entire image data are respectively saved in the text data saving section and the image data saving section, the text editor retrieves the character or the character string relevant to the confidential information in the text data portion and then the entire image data corresponding to the text data portion in which the character or the character string relevant to the confidential information has been retrieved is displayed,
the displayed entire image data is identified according to the user ID and the current date and time, and
the current data and time indicates time when the image data is generated.

2. An image forming apparatus according to claim 1, wherein
the character or the character string relevant to the confidential information in the text data portion is converted to a decorated one in a style of at least one of half-tone dot meshing, bold, italic, inversion, and underline, and the text portion including the decorated one is saved to the text data saving section.

3. An image forming apparatus according to claim 1, wherein
the user ID input section inputs the user ID and a password.

4. An image forming apparatus according to claim 1, wherein
the image data saving section and the text data saving section use a common region of a memory included in the image forming apparatus.

5. An image forming apparatus according to claim 1, further comprising:
a storage section; and
a panel controller, wherein
the image data saving section and the text data saving section are formed in the storage section,
when a vacant area for saving both the log of the text data portion in the text format and the image log of the entire image data is reserved in the storage section, the panel controller automatically sets the third saving type,
when a vacant area for saving the image log of the entire image data is reserved in the storage section rather than for saving both the log of the text data portion in the text format and the image log of the entire image data, the panel controller automatically sets the second saving type, and
when a vacant area for saving the image log of the entire image data is not reserved in the storage section, the panel controller automatically sets the first saving type.

6. A document processing system comprising:
an image forming apparatus and an external server connected together through a network, wherein
the image forming apparatus includes:
an image data generating section configured to read an original document to generate image data; and
a saving type storing section configured to store a saving type of an image log for the image data,
the external server includes:
an image data saving section configured to save the image data; and
a text data saving section configured to save a text data portion included in the image data,
character information that corresponds to the text data portion is extracted from the image data by an optical character reader,
when a first saving type indicative of processing to save a log of the text data portion included in the image data is set as the saving type, only the text data portion that is converted in a text format is saved to the text data saving section, a size of the text data portion being smaller than that of the entire image data,
when a second saving type indicative of processing to save an image log of the entire image data is set as the saving type, only the entire image data is saved to the image data saving section,
when a third saving type indicative of processing to save both of the log of the text data portion converted in the text format and the image log of the entire image data is set as the saving type, the text data portion and the entire image data are respectively saved in the text data saving section and the image data saving section,
the saving type is automatically set according to a size of a vacant area in the image data saving section and the text data saving section,
the image forming apparatus further comprises:
a user ID input section configured to input a user ID;
a file generating section configured to generate a file that includes at least one of the text data portion and the entire image data and has a name including the user ID and current date and time;
a character registering section configured to register a character or a character string relevant to confidential information; and
a character retrieval section configured to retrieve the character or the character string from the text data portion by a text editor,
when the text data portion and the entire image data are respectively saved in the text data saving section and the image data saving section, the text editor retrieves the character or the character string relevant to the confidential information in the text data portion and then the entire image data corresponding to the text data portion in which the character or the character string relevant to the confidential information has been retrieved is displayed,
the displayed entire image data is identified according to the user ID and the current date and time, and
the current date and time indicates time when the image data is generated.

7. A document processing system according to claim 6, wherein
the external server further includes a storage section in which the image data saving section and the text data saving section are formed,
the image forming apparatus further includes a panel controller,
when a vacant area for saving both the log of the text data portion in the text format and the image log of the entire image data is reserved in the storage section, the panel controller automatically sets the third saving type,
when a vacant area for saving the image log of the entire image data is reserved in the storage section rather than for saving both the log of the text data portion in the text format and the image log of the entire image data, the panel controller automatically sets the second saving type, and
when a vacant area for saving the image log of the entire image data is not reserved in the storage section, the panel controller automatically sets the first saving type.

* * * * *